No. 770,630. PATENTED SEPT. 20, 1904.
A. C. EASTWOOD.
SYSTEM OF CONTROL FOR CONVEYING BRIDGES.
APPLICATION FILED FEB. 19, 1904.
NO MODEL. 7 SHEETS—SHEET 1.

No. 770,630. PATENTED SEPT. 20, 1904.
A. C. EASTWOOD.
SYSTEM OF CONTROL FOR CONVEYING BRIDGES.
APPLICATION FILED FEB. 19, 1904.
NO MODEL. 7 SHEETS—SHEET 3.

No. 770,630. PATENTED SEPT. 20, 1904.
A. C. EASTWOOD.
SYSTEM OF CONTROL FOR CONVEYING BRIDGES.
APPLICATION FILED FEB. 19, 1904.
NO MODEL. 7 SHEETS—SHEET 7.

Fig. 7.

No. 770,630. Patented September 20, 1904.

UNITED STATES PATENT OFFICE.

ARTHUR C. EASTWOOD, OF CLEVELAND, OHIO.

SYSTEM OF CONTROL FOR CONVEYING-BRIDGES.

SPECIFICATION forming part of Letters Patent No. 770,630, dated September 20, 1904.

Application filed February 19, 1904. Serial No. 194,397. (No model.)

*To all whom it may concern:*

Be it known that I, ARTHUR C. EASTWOOD, a citizen of the United States, and a resident of Cleveland, Ohio, have invented certain Improvements in Systems of Control for Conveying-Bridges, of which the following is a specification.

My invention consists in an improved combination of apparatus for operating conveying-bridges, with particular reference to the means for controlling the motors by which a conveying-bridge and its moving parts are operated. By a "conveying-bridge" is meant a structure which spans a storage area for ore, coal, and other similar lump or granular material and which is provided with machinery for conveying said material from boats or cars to a stock pile and for removing it from the stock pile to cars or other means of transportation or directly to the point at which it is to be used. Such conveying-bridges are found at most modern blast-furnaces where a sufficient stock of ore must be unloaded and stocked during the season of navigation to meet the needs of the furnaces when navigation is closed and the supply of ore or other material is cut off. The bridge may vary from one hundred to five hundred feet in length, and at the present time most modern forms of bridges are provided with operating machinery driven either by steam or electric motors mounted in a machinery-house at one end of the bridge. Said bridge is provided with a trolley movable upon it by means of a wire-rope-transmission system, and from this trolley is usually hung a gravity-bucket, which on being lowered into the stock pile and hoisted automatically fills itself with the material thereof. In general the operator is placed in a tower at the same end of the bridge as the operating machinery and from this point controls the action of said machinery. As material is accumulated in the stock pile it assumes its natural angle of repose, taking the form of a ridge with sloping sides, so that frequently the operator is not able to see the bucket when the latter is removing material from the far side of the pile of material. Consequently a man must be stationed at a convenient point to signal the operator, while other men are required to guide the bucket to the proper place, all of which reduces the speed of operation and increases the cost thereof. Even with a small accumulation of material in the stock pile the removal thereof from the side farthest from the operator becomes a slow matter, particularly in view of the fact that said operator is several hundred feet from the point at which the work is actually being done. In order, therefore, to overcome this objection, I propose to place the operator upon the trolley of the bridge, so that he may be always directly over the bucket and hence in full view of the work. In the past this has not been done, because it has been found impracticable to mount the operating mechanism upon the trolley owing to the excessive weight thereof and to the increased cost of the bridge necessary to support such weight.

Another object of my invention is to provide means whereby an operator situated upon the trolley may accurately control the operation of the machinery carried in a stationary house at one end of the bridge, and it is further desired to provide means for enabling the operator upon the trolley to control the bridge-operating machinery, which means shall be of a relatively simple nature and of an inexpensive construction.

These objects I attain as hereinafter set forth, reference being had to the accompanying drawings, in which—

My invention includes certain controlling devices placed adjacent to the driving-motors in the machinery-house at one end of the conveying-bridge, and all of the circuit connections for starting, accelerating, stopping, and reversing the motors is effected by means of electromagnetically-operated switches. In addition to the above an operating-controller is placed on the trolley and this is provided with contacts for energizing the electromagnetic switches in a predetermined order, there being trolley-wires upon the bridge suitably connected to the windings of the operating-coils of said switches and sliding contacts engaging these trolley-wires and connected to the operating-controller. By this means the various circuit connections controlling the driving-motors may be effected from the trolley regardless of its position upon the bridge and irrespective of whether said trolley is at rest or in motion.

In the above drawings A and A' represent the two driving-motors whose armatures are indicated at $a$ and $a'$, the shunt field-windings at $a^2$ and $a^3$, and the series field-windings at $a^4$ and $a^5$. The direction of rotation of these motors is determined by the position of the contacts of an electromagnetically-operated reversing-switch, (indicated at B,) which includes movable contacts $b$, $b'$, $b^2$, and $b^3$, whose position is determined by two solenoids $b^4$ and $b^5$, it being understood that all of the movable contacts are rigidly connected by a bar (indicated by dotted lines at $b^6$) which is acted upon by the cores of said solenoids and which is electrically insulated from said contacts. Contacts 1, 2, 3 to 8 are so placed as to be suitably engaged by the movable contacts of the reversing-switch, and there is in addition carried by the bar $b^6$ a movable contact $b^7$, having fixed contacts 9 and 10, with which it coacts.

Upon a suitable switchboard adjacent to the motors A and A' are carried a number of electromagnetic switches C, D, E to K, and each of these preferably includes a pair of main contacts 11 and 12, a blow-magnet 13, a movable blade, (indicated in dotted lines at 14,) and a solenoid 15, these various parts being arranged, as well known to the art, so as to cause the blade 14 to electrically connect the contacts 11 and 12 whenever the solenoid 15 is energized. In addition there are upon certain of the switches—viz., switches C, D, E, F, and G—auxiliary contacts 16, placed to be bridged by a blade 17 whenever the main blade 14 of said switch is in position to connect the terminals 11 and 12. In each instance these auxiliary switches are connected in circuit with the operating-solenoid of that particular main switch which in operation is designed to be actuated after the switch carrying said auxiliary switch, so as to make it practically impossible to energize said solenoid until after said switch carrying the auxiliary switch has been brought to a closed position. Connected in series with the switches D, E, F, and G, respectively, are banks L, M, N, and P of resistance material, and the free terminal of each of these bodies of resistance is in electrical connection with one end of the series winding of the motor A.

In addition to the above apparatus there is upon the switchboard in the machinery-house an automatic circuit-breaker Q, of any desired type connected in series with the main switch Q', to which is attached the positive supply-main. The negative supply-main is connected to a main switch R, while in addition there is a switch S, having two terminals 18 and 19, to which are pivoted two switch-blades mechanically connected to a plunger placed to be actuated by a solenoid $s$. Contacts 20, 21, 22, and 23 are placed to be respectively engaged by said blades, and when said solenoid $s$ is energized the plunger moves the blades $s$ into engagement with the first two of these contacts, respectively, against the action of a spring or springs, which tends to retain said blades in engagement with the contacts 22 and 23 as long as said solenoid is deënergized.

Figure 1:
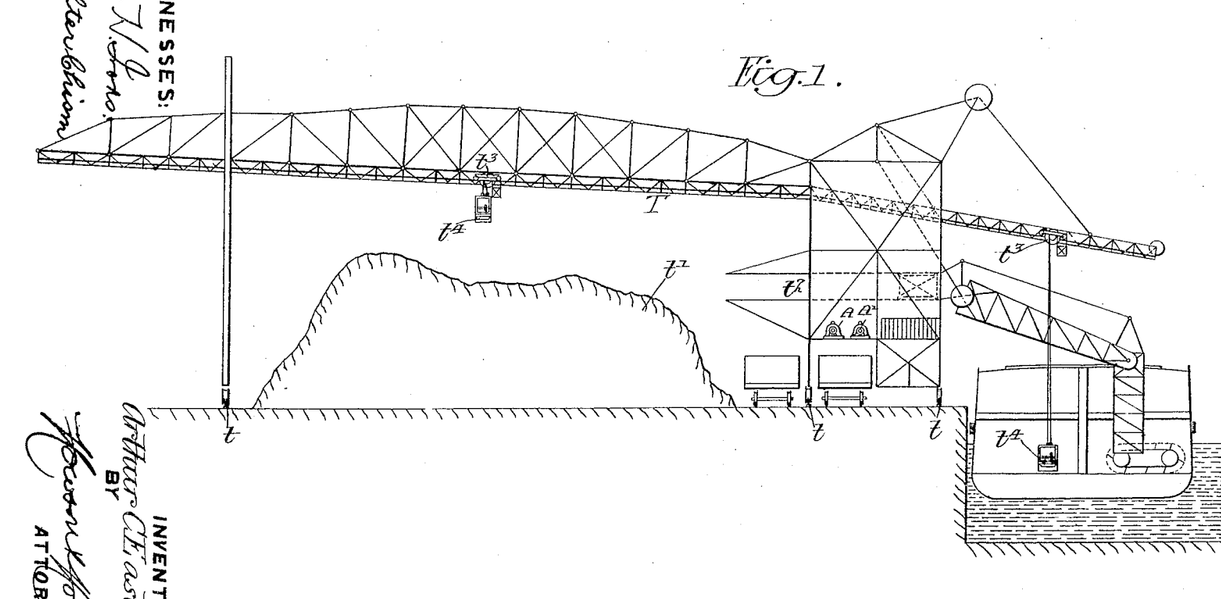
Figure 1 is a side elevation, largely diagrammatic, of a conveying-bridge, showing the relative positions of the various pieces of apparatus employed in connection with my invention.
Figure 2:
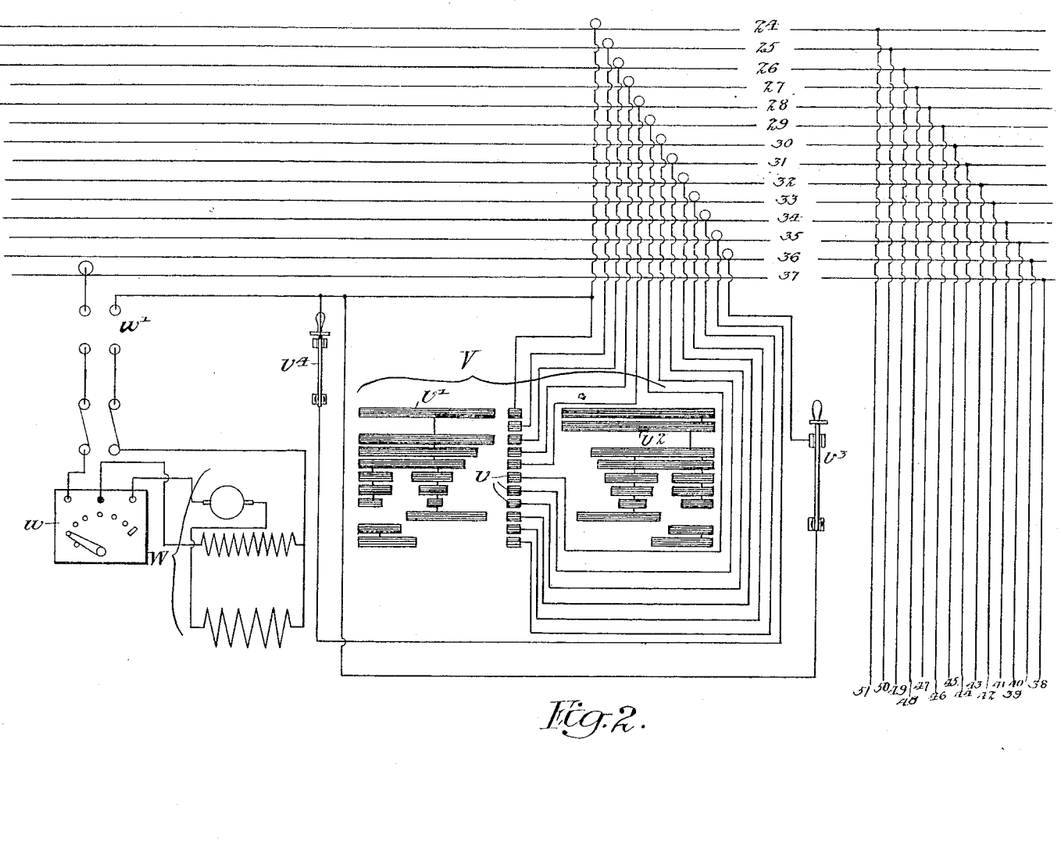
Figs. 2, 3, 4, and 5 together comprise a diagrammatic view illustrating the apparatus employed in my improved system and the various electrical connections therefor.
Figure 3:
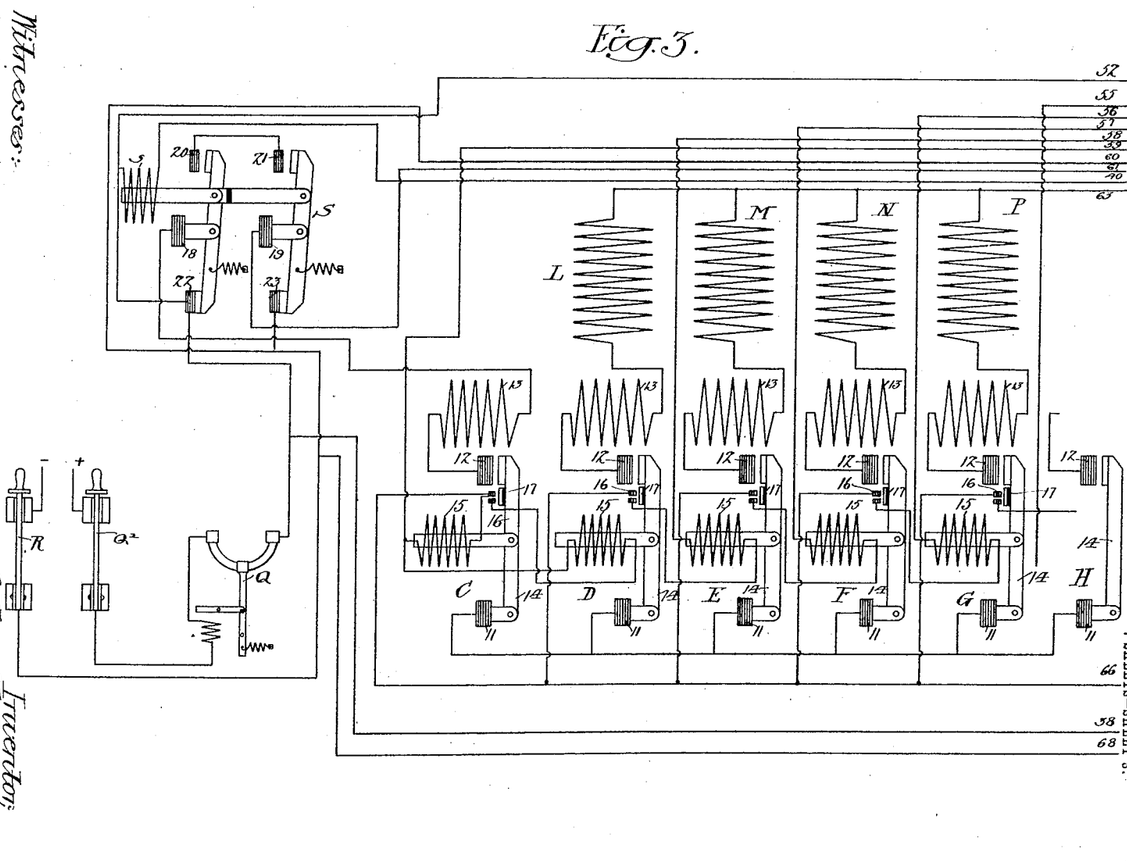
Figure 4:
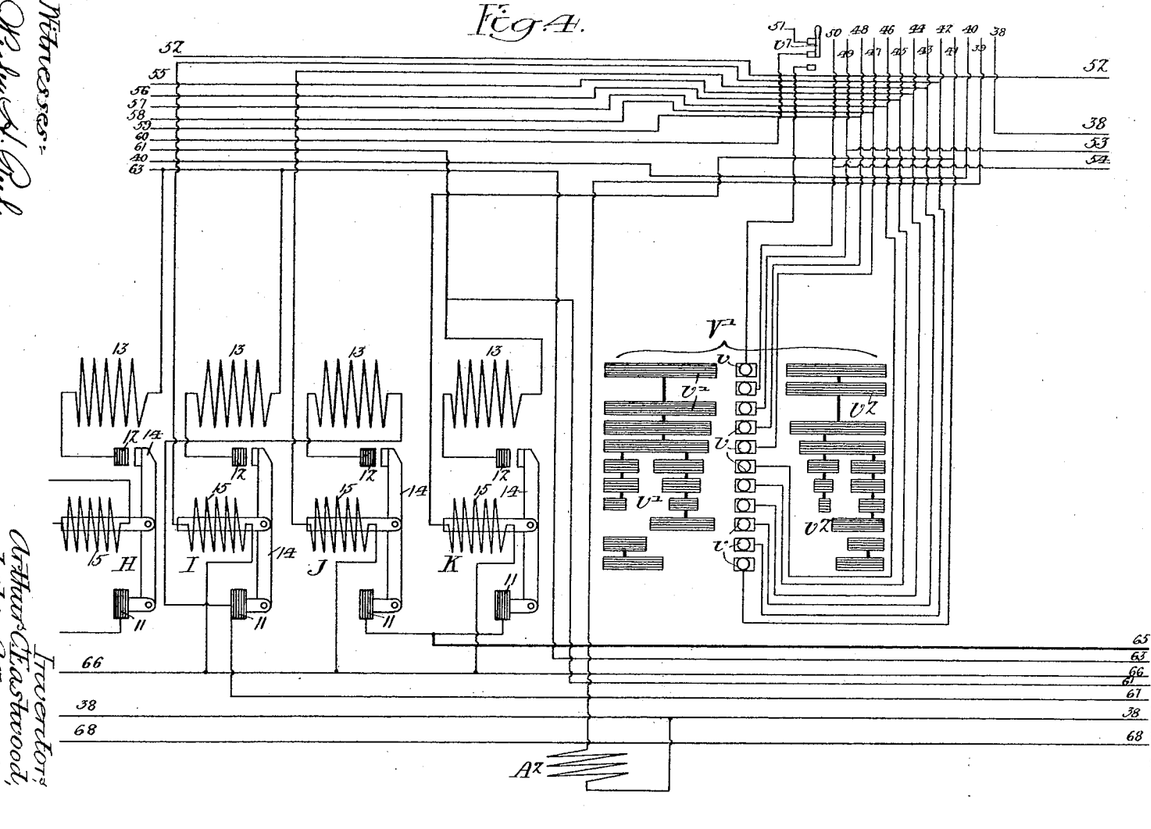
Figure 5:
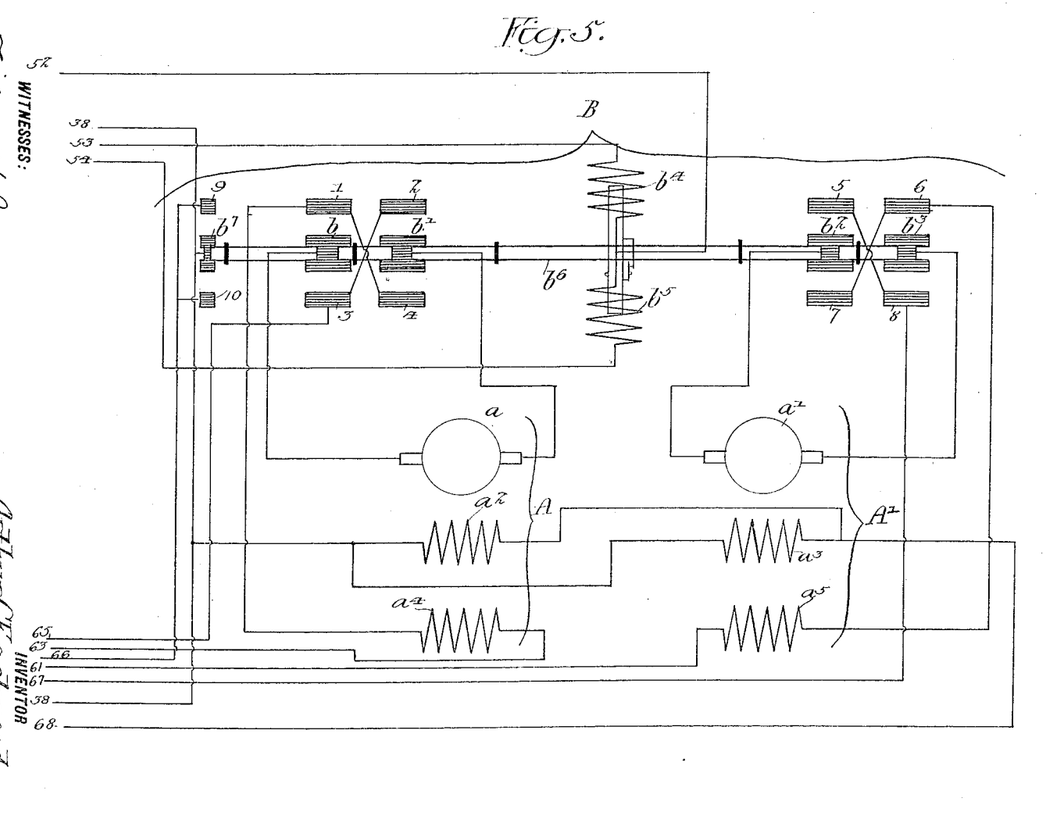
Figure 6:
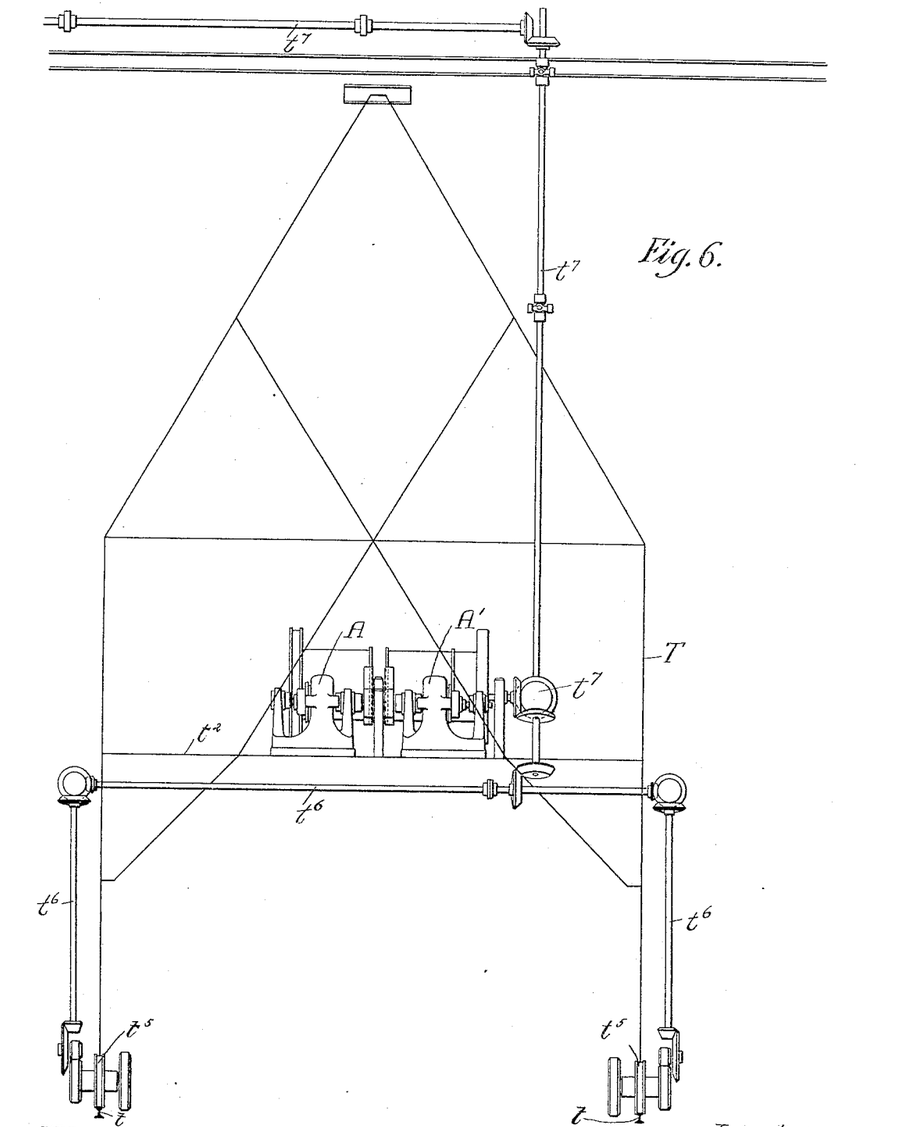
Figs. 6 and 7 are respectively a side and an end elevation, to some extent diagrammatic, of a portion of a conveying-bridge, showing the mechanism whereby said bridge may be operated from an electric motor or motors.
Figure 7:
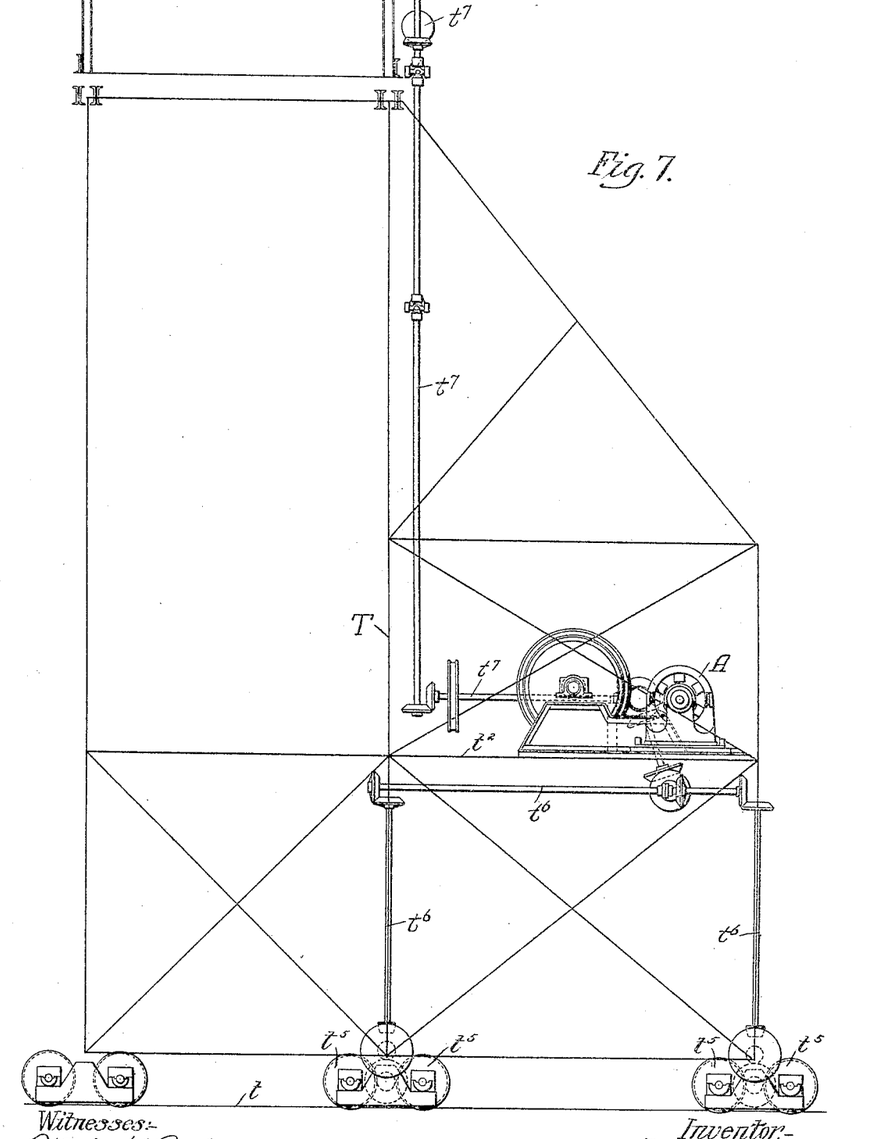

Referring to Figs. 1, 6, and 7, a well-known form of conveying-bridge is illustrated at T, this being supported upon tracks $t$, so as to be bodily movable over a stock pile, (indicated at $t'$.) Upon the portion $t^2$ is carried the machinery-house with its motors A A' and the other machinery, and there is upon the bridge a movable trolley $t^3$, from which is hung a bucket $t^4$. The two motors are operatively connected, through suitable gearing and shafting $t^6$, to the driving-wheels $t^5$ at one end of the bridge and which operate on the tracks $t$. A second line of shafting $t^7$ extends across the bridge to similar driving-wheels at its opposite end. Extending longitudinally over the bridge is a series of trolley-wires 24, 25, 26, 27 to 37, these having been omitted from Fig. 1 for the sake of clearness. It will be understood that these wires are of relatively small cross-section and are respectively engaged by trolley-wheels carried on the bridge-trolley $t^3$. Suitably connected to the various trolley-wheels is an electric controller V, having in the present instance eleven contact-fingers, (indicated at $v$,) and a barrel provided with two series of contacts $v'$ and $v^2$, respectively, these being shown in Fig. 2 as developed. In addition there is upon the trolley a switch $v^3$, having one terminal in connection with the trolley-wheel engaging the wire 24, which, if the diagram of connections be followed, will be found to be electrically connected through the main switch R with the negative supply-main. The other terminal of this switch is similarly in electrical connection with the trolley-wire 36, which is connected to the winding of an electric brake $A^2$, placed to act upon certain of the machinery operated by the motors. Noted in detail, the course of current which flows when this switch $v^3$ is closed is from the first supply-main through switch Q' and circuit-breaker Q and by way of the conductors 38 to the winding of the brake $A^2$. From this it passes through the conductor 39 to trolley-wire 36 on the conveying-bridge and through the trolley engaging therewith to one terminal of the switch $v^3$. The opposite terminal of said switch is in connection with a trolley-wheel engaging the trolley-wire 24, and the current flows from this through wire 51, switch $v^7$, wire 60, directly to the switch R, and so to the negative main. There is also a second switch $v^4$ upon the trolley, having one terminal connected to the negative supply-main through the proper trolley-wire 24 and the other through trolley-wire 35 to one end of the solenoid $s$ for operating the switch S, it being seen from Fig. 3 that the other end of the winding of this solenoid is in electrical connection with the circuit-breaker Q, connected to the positive supply-main. Upon the trolley is a relatively small compound-wound motor W, having a starting-box $w$ and with its terminals connected, respectively, through suitable switches to the trolley-wires 24 and 37, one of which, as above noted, is in direct connection with the negative supply-main, while the other is connected with the positive supply-main through the circuit-breaker Q. In addition to the hand-controller V upon the trolley I also provide a second controller, V′, in the machinery-house, so that it is possible, if desired, to operate the motors from such position instead of from the trolley. These two controllers are identical in all respects and have the same connections. A double-throw switch $v^7$ is also placed in the machinery-house and is connected with its center terminal in electrical communication with the negative supply-main through the conductor 60 and the main switch R, and one of the remaining terminals communicates through the conductor 51 with the trolley-wire 24, while the third terminal is connected to the contact-finger $v$ of the controller V′, which finger during operation of the said controller is always in engagement with one of the contacts of the controller-barrel. It will be seen that when it is wished to use the controller V to operate the above-described mechanism this switch is thrown so as to connect the negative supply-main with the trolley-wire 24, while if the controller V′ is to be used the switch is made to form connection between the finger $v$ and the negative supply-main. If now the switch $v^7$ be thrown so as to connect the topmost finger of the controller V with the negative supply-main, the main switches and circuit-breaker be closed, and the barrel of said controller be revolved so as to bring the segments of the first point into engagement with their respective fingers, current will flow from the positive supply-main through main switch Q′ and circuit-breaker Q, through conductor 52 to one of the solenoids of the switch B—for example, $b^5$. From this said current passes through wires 54 and 50 to trolley-wire 25 on the bridge and through the corresponding trolley-wheel to the second finger of the controller V, to the segment engaged thereby and its adjacent segment engaged by the topmost finger of the controller, from here flowing to trolley-wire 24 and thence to the negative supply-main. The energization of the solenoid $b^5$ brings the three sets of contacts carried by the movable bar $b^6$ of the switch B into engagement with the fixed contacts 3, 4, 7, 8, and 10; and when the barrel of the controller V is moved to its second point current flows from the positive main through wire 38, contacts $b^7$ and 10 of switch B, wire 66, magnet-coil 15 of switch J, wire 43, to trolley-wire 32 and to the third finger from the bottom of the column of fingers in controller V. From here it passes to the segments upon the controller-barrel and to the topmost finger, from here flowing to trolley-wire 24, and hence to the negative supply-main. This energization of the coil of switch J causes said switch to close, though the main motor-current still remains open until the controller V is moved to the third point. When this is done, current flows from the positive supply-main through wire 38, contacts $b^7$ and 10 of switch B, wire 66, and coil of switch C, which closes, and thus permits energization of the coil 15 of switch D and closing it also. From these coils the current flows through wires 59 and 48 and trolley-wire 27 to the fourth finger from the top of the fingers of controller V, thence passing through the segments of the controller-barrel to the topmost finger to the trolley-wire 24 and negative supply-main. This closing of switches C and D finally completes the circuit through the two motors, the current flowing from the positive supply-main through switch Q′, circuit-breaker Q, contacts 22 and 18 of switch S, through switches C and D, resistance L, wire 63, field-winding $a^4$ of motor A, contacts 1, 4, and $b'$ of switch B, and wire 65 to switch J. Passing through this switch the current flows to terminal 11 of switch I, wire 67, contacts 8 and $b^3$ of switch B, armature $a'$ of motor A′, contacts $b^2$, 7, and 6 of said switch, field-winding $a^5$ of said motor, wire 61 to contacts 19 and 23 of switch S, through main switch R, and hence to the negative supply-main. If the course of the current be followed as the operation of the controller V is continued, it will be found that the switches are operated in a predetermined order, such that said motors are supplied with current and operated first in series with a relatively high resistance and with each other. As the various switches are successively operated said resistance is gradually cut out, after which the motors are connected in multiple and again supplied with current through resistance, which is again cut out, so that the speed of the motors is gradually increased in the well-known manner. As above noted, the two controllers V and V' are provided for causing the switches C, D, E to K to be energized in the correct order, so that it will be seen that an operator on the trolley of the bridge may by turning the barrel of the controller V in either direction cause the said switches to be actuated, so as to operate the motors A and A' at any desired speed, and thereby bodily propel the bridge through any desired form of gearing known to the art traverse the trolley or hoist the bucket. By closing the switch $v^4$ it will be seen that the solenoid $s$ of the switch S will be energized and that the two movable contacts 18 and 19 of said switch will be electrically connected to each other, thereby short-circuiting the two motors A and A' through the starting resistance and causing them to act as generators short-circuited upon themselves, so as to bring their armatures, and consequently the machinery connected thereto, to rest. In accomplishing this result current will flow from the positive supply-main through switch Q' and circuit-breaker Q to the live terminal of switch S and from this to the solenoid $s$. From here the current will pass through conductor 40 to trolley-wire 35 on the conveyer-bridge to the corresponding trolley-wheel and to one terminal of switch $v^4$. The second terminal of this switch is connected, through a suitable conductor and a trolley-wheel, to the trolley-wire 24, which, as noted in connection with the switch $v^3$, is connected, through the switch $v^7$, to the negative supply-main. With the switch S closed, as noted, the switch B, also closed under the action of solenoid $b^5$ and the motors acting as generators, current will flow from armature $a'$ of motor A' through contacts $b^2$, 7, and 6 of switch B, field-winding $a^5$ of said motor, wire 61, to contacts 19 and 21 of switch S. From this latter contact the current passes to contacts 20 and 18 of said switch and flows through switches C and D, resistance L, wire 63, field-winding $a^4$ of motor A, contacts 1, 4, and $b'$ of switch B, armature $a$ of said motor, contacts $b$ and 3 of switch B, wire 65, switch J, terminal 11 of switch I, wire 67 to contacts 8 and $b^3$ of switch B, and from this latter contact to the armature $a'$ of the motor A. The amount of the braking force resulting from such action depends upon the amount of resistance in circuit and can be regulated by the operating-controller, as previously described. In lowering the load the switch $v^4$ is thrown by the operator and this energizes the solenoid S, thus bringing the contacts 18 and 19 into engagement with the electrically-connected contacts 20 and 21 and at the same time disconnecting the series windings of the motors from the supply-main by breaking the connection with the contacts 22 and 23. The controller V is then operated in the direction which would cause the motors to hoist a load under normal conditions with current received from the lines, this being done in order that the current generated by the motors acting as generators shall cause the same polarity of magnetization through the series windings of the field-magnets as that caused by the shunt-windings of said fields, which, as will be noted, remain constantly connected across the supply-mains. By so operating the controller the speed of the load can be as accurately regulated in lowering as in hoisting, at the same time drawing no current from the line except for the shunt-fields of the motors and the switch-solenoids. Since the current required for the operation of the electromagnetic switches is relatively small, (under five amperes,) the trolley-wires may be of relatively small gage, and it will be seen that the large driving-motors A and A' are thus easily and reliably controlled from the movable trolley by the use of simple and inexpensive apparatus.

In order to clearly identify the various connecting-wires, (shown in Figs. 2 and 6, inclusive,) I have indicated all of those directly connected to the trolley-wires by the numerals 38 to 51, inclusive. The three wires for the solenoids $b^4$ and $b^5$ are indicated by the numerals 52, 53, and 54, while the wires cut by a section taken between switches G and H are indicated by the numerals 52, 55 to 63, inclusive, 66, 38, and 68. Similarly the wires running to the motors and to the reversing-switch therefor are indicated at 38, 61, 63, and 65 to 68, inclusive.

Under certain conditions of operation the cable or cables through which motion is transmitted from the large motors to the trolley becomes more or less slack, and for the purpose of taking up this slack I provide the motor W, which is carried by the trolley and geared in any desired manner to a drum, upon which may be wound temporarily, if desired, such slack in the trolley-traversing cable.

Under operating conditions the power required for the operation of this machine is relatively small, the motor being in the case illustrated a five-horse-power unit with compound windings and provided with a double-pole main switch $w'$ and a starting-box $w$, whereby its operation may be regulated in the well-known manner.

I claim as my invention—

1. The combination of a conveying-bridge, a trolley movable thereon, a motor carried by a portion of the bridge structure other than the trolley, a switch for controlling the action of said motor, a conductor on the bridge connected with said switch and a contact-piece on the movable trolley engaging said conductor, with a controlling device also on the trolley connected to said contact-piece for causing the operation of said switch, substantially as described.

2. The combination of a conveying-bridge, a trolley movable thereon, a motor carried by a portion of the bridge structure other than the trolley for operating the mechanism thereof, a switch for controlling the action of said motor, means on the trolley for causing the operation of said switch and means for connecting the switch and the said operating means therefor, substantially as described.

3. The combination of a conveying-bridge, a trolley movable thereon, a motor carried on a portion of the bridge structure other than the trolley, a series of electromagnetically-operated switches electrically connected with the motor, a controller carried by the trolley, a series of conductors on the bridge connected to the magnets of said switches and contacts connected to the controller on the trolley and in engagement with the conductors on the bridge, substantially as described.

4. The combination of a conveying-bridge, a trolley movable thereon, a plurality of motors carried on a portion of the bridge structure other than the trolley, a series of electromagnetically-operated switches in circuit with said motors, a series of conductors extending longitudinally of the bridge and connected to the magnets of the switches, contacts on the trolley engaging said conductors and a controller on the trolley connected to said contacts for operating the electromagnetic switches in predetermined order, substantially as described.

5. The combination of a conveying-bridge, a trolley movable thereon, a motor carried on a portion of the bridge other than the trolley, a switch or switches having electromagnetic operating means for controlling the action of the motor, a series of conductors on the bridge connected to the switch-operating means, a controller on the trolley, and contacts connecting the controller with the conductors on the bridge, a second controller carried by the bridge and also connected to said switches, with a switch for connecting either one or the other of said controllers, so that it alone will actuate the switches, substantially as described.

6. The combination of a conveying-bridge, a trolley movable thereon, a motor carried by a portion of the bridge other than the trolley, means for controlling the operation of said motor, said means including a switch having connections whereby the motor may be connected either to the supply-mains or in a closed circuit independent of said mains and means for operating said switch from the trolley, substantially as described.

7. The combination of a conveying-bridge, a trolley movable thereon, a series of conductors extending longitudinally of the bridge, contacts carried by the trolley and engaging said conductors, a series of electromagnetic switches, motors carried by the bridge structure and connected to said switches, and means carried by the trolley for controlling the action of said motors, said means including an independent switch in circuit with one of the electromagnetic switches, said latter switch having connections with the motors such that when it is closed said motors are connected in a closed circuit independent of the supply-mains, substantially as described.

8. The combination of a motor, a reversing-switch for the same, a solenoid or solenoids for operating said switch, a series of electromagnetic switches connected to the motors and to the reversing-switch, a series of conductors connected to the solenoids of the reversing-switch and of the electromagnetic switches, a movable structure having contacts engaging said conductors and a controlling device connected to said conductors and carried on said movable structure, substantially as described.

9. The combination of a motor, a double-acting reversing-switch therefor having an operating-solenoid and including auxiliary contacts, means including a series of electromagnetically-operated switches for varying the speed of the motor, and a controller for actuating the magnets of said switches in a predetermined order, certain of said magnets and a supply-main being connected to the auxiliary contacts of the reversing-switch in such manner that the said magnets operate under similar conditions irrespective of the position of the reversing-switch, substantially as described.

10. The combination of a motor, a reversing-switch therefor having a solenoid or solenoids by which it is operated and including auxiliary contacts, means including a series of electromagnetically-operated switches for varying the speed of the motor and a controller for actuating the magnets of said switches in a predetermined order, certain of said magnets being connected to a current-supply main through the auxiliary contacts of the reversing-switch, and having in circuit with them switches closed by the operation of an electromagnetic switch, other than the one controlled by them, substantially as described.

11. The combination of a plurality of motors, a reversing-switch controlling the direction of rotation of both of said motors, a solenoid for operating said switch, means including electromagnetically-operated switches for varying the speed of the motor, a series of conductors in circuit with the solenoids of said switches and of the reversing-switch, a movable structure having a controller and contacts connected to said controller and engaging said conductors, substantially as described.

12. The combination of a bridge structure having fixed to it a motor, a movable trolley operated from said motor, means also carried by the bridge for varying the speed of the motor, two controllers for governing the action of said means, one of the said controllers being on the trolley and connections between the controllers and the speed-varying means of the motor, substantially as described.

13. The combination of a bridge structure having on it a motor, a movable trolley, a series of electromagnetic switches on the bridge for regulating the flow of current to the motor, a controller on the movable trolley having means for connecting it to said switches, an additional switch for short-circuiting the motor independently of the source of current-supply and a switch on the trolley for operating said additional switch, substantially as described.

14. The combination of a bridge structure having a movable trolley, a motor on a fixed portion of said bridge structure, a body of resistance, a series of switches for connecting the motor to the current-supply mains and for regulating the amount of said resistance in circuit with the motor, means carried by the trolley and electrically connected to said switches for actuating the same with an electromagnetic switch having connections whereby it may either connect said motor to the supply-mains or short-circuit it through the resistance, and a switch on the trolley for operating said switch, substantially as described.

15. The combination of a conveying-bridge, a trolley movable thereon, a motor carried on a portion of the bridge other than the trolley, a switch or switches having electromagnetic operating means for controlling the action of the motor, a series of conductors on the bridge connected to the switch-operating means, a controller on the trolley, and contacts connecting the controller with the conductors on the bridge, a second controller carried by the bridge and also connected to said switches, with a double-pole switch interposed between said controllers and one of the supply-mains whereby either controller may at will be rendered operative to actuate the switches, substantially as described.

16. The combination of a conveying-bridge, a trolley movable thereon, a motor for operating the mechanism of said bridge and an automatic speed-switch for controlling the action of said motor, means on the trolley for controlling the operation of said switch and means for connecting the switch and the controlling means therefor, substantially as described.

17. The combination of a conveying-bridge, a trolley movable thereon, a motor for operating said bridge, a device on the trolley for controlling said motor and means for operatively connecting said device and the motor, substantially as described.

18. The combination of a conveying-bridge having a trolley, with a motor, an automatic speed switch or switches for controlling said motor, two controlling devices of which one is the trolley, means for operatively connecting said devices to the automatic switch or switches, with a switch for connecting either of said devices so that it alone will actuate said switch or switches, substantially as described.

In testimony whereof I have signed my name to this specification in the presence of two subscribing witnesses.

ARTHUR C. EASTWOOD.

Witnesses:
   JAMES McMORRIS,
   WILLIAM E. BRADLEY.